(12) United States Patent
Ko et al.

(10) Patent No.: US 11,412,354 B2
(45) Date of Patent: *Aug. 9, 2022

(54) TERMINAL PARTICIPATING IN GROUP CALL ESTABLISHED BASED ON MCPTT SERVICE AND METHOD OF OPERATING THE TERMINAL

(71) Applicant: SAMSUNG ELECTRONICS CO., LTD., Suwon-si (KR)

(72) Inventors: Min-suk Ko, Hwaseong-si (KR); Jun-hyuk Ko, Suwon-si (KR); Jae-sang Lim, Suwon-si (KR); Jin-su Jeong, Suwon-si (KR); Bo-ra Hyun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,468

(22) Filed: Dec. 2, 2020

(65) Prior Publication Data
US 2021/0176606 A1    Jun. 10, 2021

Related U.S. Application Data

(63) Continuation of application No. 16/104,677, filed on Aug. 17, 2018, now Pat. No. 10,880,696.

(30) Foreign Application Priority Data

Dec. 18, 2017    (KR) .................. 10-2017-0174169

(51) Int. Cl.
*H04W 4/10*    (2009.01)
*H04W 4/08*    (2009.01)
*H04W 4/70*    (2018.01)

(52) U.S. Cl.
CPC .............. *H04W 4/10* (2013.01); *H04W 4/08* (2013.01); *H04W 4/70* (2018.02)

(58) Field of Classification Search
CPC .......... H04W 4/10; H04W 4/08; H04W 4/70; H04M 1/72522; H04M 4/56
(Continued)

(56) References Cited

U.S. PATENT DOCUMENTS 7,675,875 B2    3/2010    Lim
7,809,391 B2    10/2010    Kwon
(Continued)

FOREIGN PATENT DOCUMENTS

| CN | 1756392 A | 4/2006 |
| CN | 107046682 A | 8/2017 |

(Continued)

OTHER PUBLICATIONS

Communication dated Jul. 28, 2021 issued by the State Intellectual Property Office of the P.R.China in application No. 201811532057.0.

(Continued)

*Primary Examiner* — John J Lee
(74) *Attorney, Agent, or Firm* — Sughrue Mion, PLLC

(57) ABSTRACT

A terminal participates in a group call based on a Mission Critical Push to Talk (MCPTT) service. The terminal includes a baseband processor and an application processor. In some embodiments, the baseband processor receives an MCPTT service-related message from outside and determines whether to transmit the MCPTT service-related message to the application processor. The baseband processor may make the determination based on the MCPTT service-related message or based on an operation state of the application processor. As a result of the determining, some embodiments include performing, by at least one of the
(Continued)

baseband processor and the application processor, MCPTT service-related operations.

20 Claims, 15 Drawing Sheets

(58) Field of Classification Search
USPC .............................. 455/517, 519, 520, 67.11
See application file for complete search history.

(56) References Cited

U.S. PATENT DOCUMENTS

| | | | |
|---|---|---|---|
| 7,925,287 | B2 | 4/2011 | Park et al. |
| 8,649,813 | B2 | 2/2014 | Tiwari et al. |
| 8,868,685 | B2 | 10/2014 | Bhaskaran |
| 9,277,373 | B2 | 3/2016 | Kerger et al. |
| 9,655,049 | B2 | 5/2017 | De Sabatino |
| 10,321,490 | B2 | 6/2019 | Freytsis et al. |
| 10,841,972 | B2 | 11/2020 | Choi et al. |
| 2003/0078064 | A1 | 4/2003 | Chan |
| 2005/0239487 | A1* | 10/2005 | Glass ............... H04W 72/005 455/519 |
| 2006/0084408 | A1 | 4/2006 | Wan |
| 2012/0289227 | A1 | 11/2012 | Dhodapkar |
| 2015/0109908 | A1 | 4/2015 | Andrada et al. |
| 2016/0381720 | A1* | 12/2016 | Baek ............... H04L 65/4061 370/329 |
| 2017/0245123 | A1* | 8/2017 | Baek ............... H04W 76/45 |
| 2018/0103364 | A1* | 4/2018 | Gholmieh ........... H04W 40/246 |

FOREIGN PATENT DOCUMENTS

| | | |
|---|---|---|
| JP | 2011-082997 A | 4/2011 |
| KR | 10-2006-0014626 A | 2/2006 |
| KR | 10-0556284 B1 | 3/2006 |
| KR | 10-1672746 B1 | 11/2016 |
| KR | 10-2017-0020564 A | 2/2017 |
| KR | 10-2017-0097569 A | 8/2017 |

OTHER PUBLICATIONS

Communication dated Nov. 22, 2021, issued by the Korean Intellectual Property Office in Korean Application No. 10-2017-0174169.

* cited by examiner

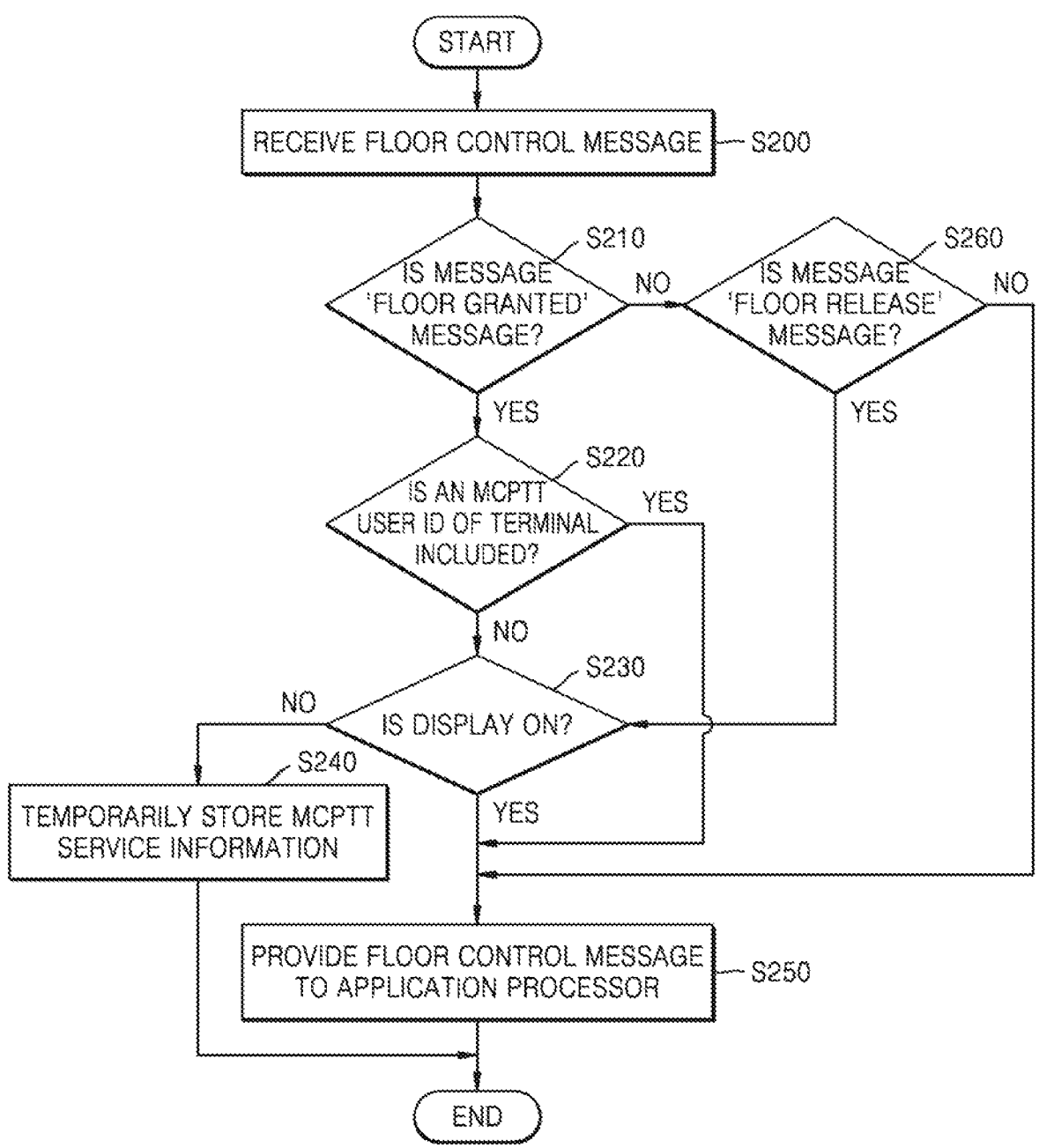

FIG. 8B

| IEI | INFORMATION ELEMENT | TYPE/REFERENCE | PRESENCE | FORMAT | LENGTH |
|---|---|---|---|---|---|
| | GROUP CALL ANOUNCEMENT MESSAGE IDENTITY | MESSAGE TYPE | M | V | 1 |
| | CALL IDENTIFIER | CALL IDENTIFIER | M | LV-E | 3-x |
| | CALL TYPE | CALL TYPE | M | V | 1 |
| | REFRESH INTERVAL | REFRESH INTERVAL | M | V | 2 |
| | MCPTT GROUP ID | MCPTT GROUP ID | M | LV-E | 3-x |
| | SDP | SDP | M | LV-E | 3-x |
| | ORIGINATING MCPTT USER ID | MCPTT USER ID | M | LV-E | 3-x |
| | CALL START TIME | CALL START TIME | M | V | 5 |
| | LAST PRIORITY CHANGE TIME | LAST PRIORITY CHANGE TIME | M | V | 5 |
| | LAST USER TO CHANGE PRIORITY | MCPTT USER ID | M | LV | 3-x |
| | CONFIRM MODE INDICATION | CONFIRM MODE INDICATION | O | TV | 1 |
| | PROBE RESPONSE | PROBE RESPONSE | O | TV | 1 |

TERMINAL PARTICIPATING IN GROUP CALL ESTABLISHED BASED ON MCPTT SERVICE AND METHOD OF OPERATING THE TERMINAL

CROSS-REFERENCE TO RELATED APPLICATION

This is a Continuation Application of U.S. patent application Ser. No. 16/104,677 filed on Aug. 17, 2018, which is based on and claims priority under 35 U.S.C. § 119 to Korean Patent Application No. 10-2017-0174169, filed on Dec. 18, 2017, in the Korean Intellectual Property Office, the disclosures of which are incorporated herein by reference in their entirety.

BACKGROUND

Embodiments of the present application relate to a terminal providing a Mission Critical Push to Talk (MCPTT) service, and more particularly, to a terminal performing MCPTT service-related operations, in consideration of reducing power consumption and a method of operating the terminal.

Communication services such as a push-to-talk (PTT) service provide methods by which two or more users may participate in communications. The users may request (for example, by pressing a button) usage permission for participating in communication. When the permission is granted, a user has the right to talk, also called having the floor. Having the floor is generally associated with the terminal as well as associated with the user of the terminal. An advanced type of critical communication service is referred to as the MCPTT service through Long-Term Evolution (LTE). The MCPTT service provides an advanced type of PTT service which is appropriate for mission critical scenarios and is based on a $3^{rd}$ Generation Partnership Project (3GPP) Evolved Packet System (EPS) service.

The MCPTT service is aimed at providing critical communication services for organizations related to public safety, transportations, public services, industries, or management of atomic power plants. 3GPP Release-13 is standardizing the MCPTT and isolated Evolved Universal Terrestrial Radio Access Network (E-UTRAN) operations for public safety communications. According to purposes of public safety communication, a degree of power consumption in performing the MCPTT service may be an important performance index, and research to reduce power consumption amounts of terminals used for performing the MCPTT service is currently being conducted.

SUMMARY

Embodiments of the present application relate to a terminal which may reduce power consumption and a method of operating the terminal when providing a mission critical push to talk (MCPTT) service.

According to an aspect of an embodiment, there is provided a method of operating a terminal participating in a group call based on an MCPTT service, wherein the terminal includes a baseband processor and an application processor, the method including: receiving an MCPTT service-related message from outside by the baseband processor; determining by the baseband processor, whether to transmit the MCPTT service-related message to the application processor, based on at least one of the MCPTT service-related message and an operation state of the application processor; and performing MCPTT service-related operations by at least one of the baseband processor or the application processor, based on a result of the determination.

According to another aspect of an embodiment, there is provided a method of operating a terminal participating in a group call established based on the MCPTT service, wherein the terminal includes a baseband processor and an application processor, the method including: receiving an MCPTT service-related message from outside by the baseband processor; determining by the baseband processor whether the application processor needs to be changed from an idle state to a normal state, based on the MCPTT service-related message; and transmitting the MCPTT service-related message to the application processor and performing MCPTT service-related operations by the baseband processor, based on a result of the determination.

According to another aspect of an embodiment, there is provided a terminal participating in a group call established based on the MCPTT service, the terminal including a baseband processor and an application processor to process the MCPTT service-related message, wherein the baseband processor receives the MCPTT service-related message and determines whether to transmit the MCPTT service-related message to the application processor, based on at least one of the MCPTT service-related message and an operation state of the application processor.

In some embodiments, an MCPTT group of terminals may provide the MCPTT service in an off-network state for users of the terminals in a situation in which a communication infrastructure, such as a group of base stations, is not available. Some messages are associated with this off-network scenario, for example, MCPTT off-network protocol (MONP) messages.

Provided herein is a method of operating a terminal participating in a group call established based on a MCPTT service, wherein the terminal comprises a baseband processor and an application processor. The method includes receiving, by the baseband processor, an MCPTT service-related message; determining, by the baseband processor, whether to transmit the MCPTT service-related message to the application processor, based on at least one of the MCPTT service-related message and an operation state of the application processor; and performing, by at least one of the baseband processor and the application processor, operations related to the MCPTT service, based on a result of the determining whether to transmit.

In some embodiments, the MCPTT service-related message comprises at least one of a floor control message and an MONP message.

In some embodiments, the receiving the MCPTT service-related message further includes receiving a floor control message, and the determining of whether to transmit the MCPTT service-related message to the application processor includes determining, by the baseband processor, whether to transmit the floor control message to the application based on a type of the floor control message.

In some embodiments, the determining whether to transmit the floor control message to the application processor is further based on, when the floor control message is a first message related to changing a right to talk with respect to other terminal participating in the group call, an operation state of the application processor.

In some embodiments, the first message is one of a Floor Taken message and a Floor Idle message and a state of the terminal is an on-network state, and one of a Floor Granted message and a Floor Release message and the state of the terminal is an off-network state.

In some embodiments, the determining of whether to transmit the floor control message to the application processor further comprises determining, when the application processor is in an idle state, not to transmit the floor control message to the application processor.

In some embodiments, the performing of the operations related to the MCPTT service further comprises storing, by the baseband processor, MCPTT service information corresponding to the floor control message in a memory of the terminal.

In some embodiments, the MCPTT service information comprises at least one of information of a current talker who has the floor, a talk start time of the current talker, information of a previous talker who lost the floor, and a talk end time of the previous talker.

In some embodiments, the performing of the operations related to the MCPTT service further includes receiving, by the application processor, the stored MCPTT service information when the operation state of the application processor is changed from the idle state to a normal state; and outputting, by the application processor, the stored MCPTT service information to a display of the terminal.

In some embodiments, the determining of whether to transmit the floor control message to the application processor includes determining, when the floor control message is a second message related to changing the right to talk with respect to the terminal, determining to transmit the floor control message to the application processor.

In some embodiments, the performing of the operation related to the MCPTT service includes receiving, by the application processor, the floor control message from the baseband processor; and outputting MCPTT service information corresponding to the floor control message to a display of the terminal.

In some embodiments, the receiving the MCPTT service-related message comprises receiving, by the baseband processor, an MONP message, and wherein the determining of whether to transmit the MCPTT service-related message to the application processor is further based on whether the MONP message is a group call announcement message.

In some embodiments, the determining of whether to transmit the MCPTT service-related message to the application processor includes determining, by the baseband processor when the MONP message is a first group call announcement message, whether to transmit the MONP message to the application processor based on whether a second group call announcement message is stored in advance in a memory of the terminal.

In some embodiments, the determining whether to transmit the MCPTT service-related message to the application processor includes comparing, when the second group call announcement message is stored in advance in the memory of the terminal, the first group call announcement message and the second group call announcement message and determining whether to transmit the MONP message to the application processor based on a result of the comparing.

In some embodiments, the determining of whether to transmit the MCPTT service-related message to the application processor includes, when the first group call announcement message is identical to the second group call announcement message, to not transmit the first group call announcement message to the application processor, and wherein the performing of the operations related to the MCPTT service further comprises periodically broadcasting the second group call announcement message by the baseband processor to at least another terminal participating in the group call.

In some embodiments, the method includes determining, by the baseband processor based on the MCPTT service-related message, whether there is a terminal having a right to talk among a plurality of terminals participating in the group call; and controlling, based on a result of the determining whether there is a terminal having the right to talk, on and off states of a voice codec by the baseband processor.

Also provided herein is an additional method of operating a terminal participating in a group call established based on a MCPTT service, wherein the terminal comprises a baseband processor and an application processor, the additional method includes receiving, by the baseband processor, an MCPTT service-related message; determining, by the baseband processor based on the MCPTT service-related message, whether an application processor operation state needs to be changed from an idle state to a normal state; transmitting the MCPTT service-related message to the application processor; and performing operations related to the MCPTT service, by the baseband processor, based on a result of the determining whether the application processor operation state needs to be changed.

In some embodiments of the additional method the determining of whether the application processor operation state needs to be changed is based, when the MCPTT service-related message is a floor control message, on whether the floor control message is a message related to changing a floor with respect to the terminal.

In some embodiments of the additional method the determining whether the application processor operation state needs to be changed is based, when the MCPTT service-related message is a group call announcement message, on whether the group call announcement message is identical to a group call announcement message to be broadcast by the terminal.

Also disclosed herein is a terminal including a memory; an application processor; and a baseband processor. The memory includes instructions that when executed by the baseband processor cause the baseband processor to perform operations including receiving a MCPTT service-related message, and determining, based on at least one of the MCPTT service-related message and an operation state of the application processor, whether to transmit the MCPTT service-related message to the application processor.

BRIEF DESCRIPTION OF THE DRAWINGS

Embodiments will be more clearly understood from the following detailed description taken in conjunction with the accompanying drawings in which:

FIG. 5 is a flowchart showing operations of the baseband processor of FIG. 2A in the off-network state;

FIG. 8B is a diagram for describing information included in the group call announcement message;

DETAILED DESCRIPTION OF THE EMBODIMENTS

Figure 1A:
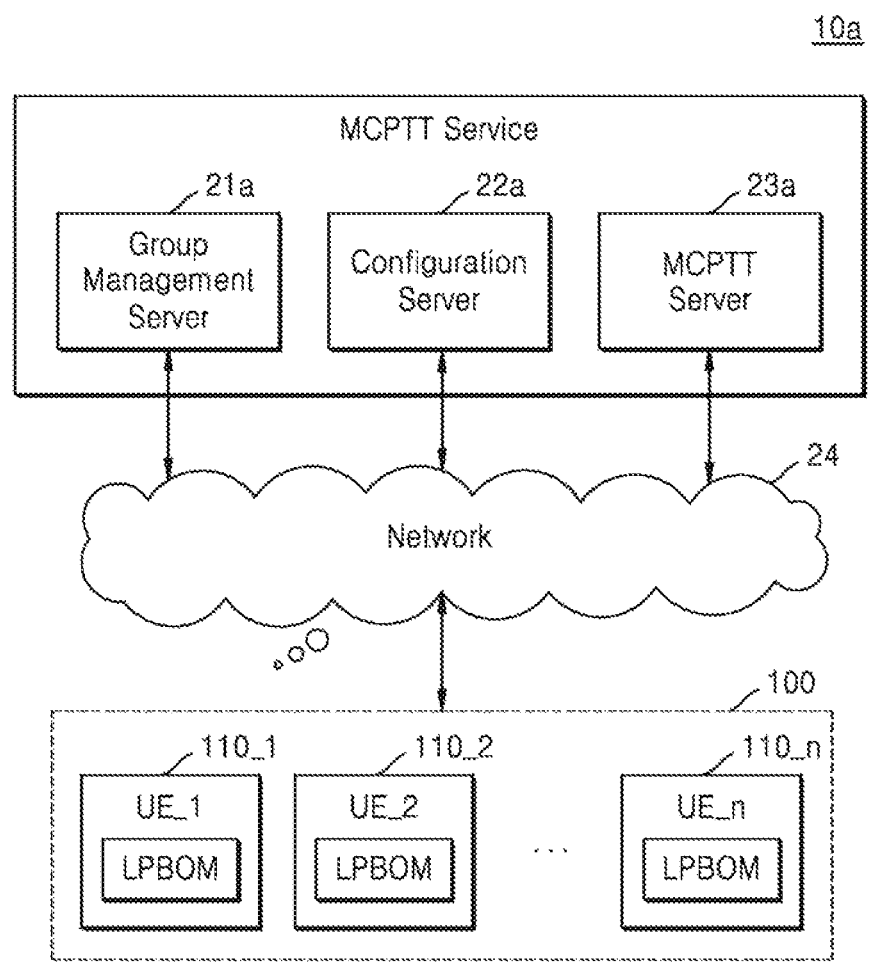
FIG. 1A is a block diagram schematically illustrating a Mission Critical Push to Talk (MCPTT) service system in an on-network state, according to an embodiment.
Figure 1B:
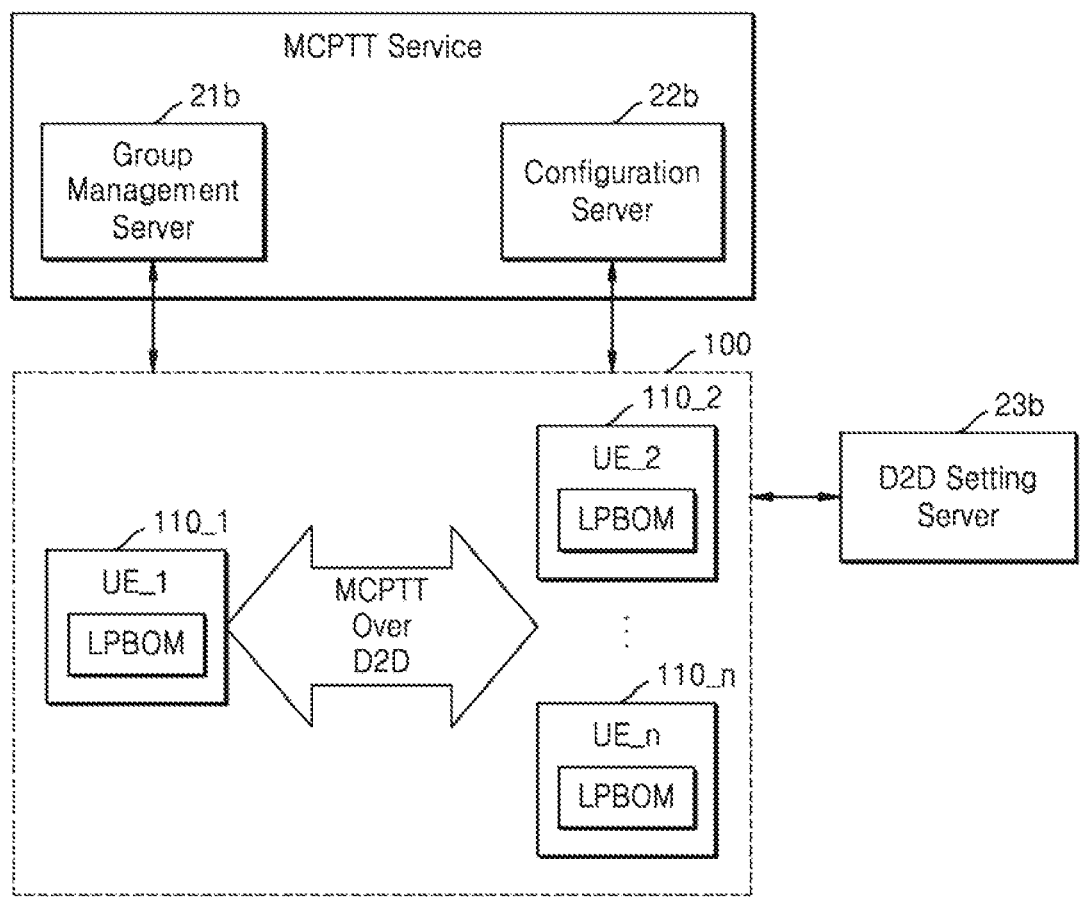
FIG. 1B is a block diagram schematically illustrating an MCPTT service system in an off-network state.

Aspects of the embodiments will now be described more fully with reference to the accompanying drawings FIG. 1A is a block diagram schematically illustrating a Mission Critical Push to Talk (MCPTT) service system in an on-network state according to an embodiment, and FIG. 1B is a block diagram schematically illustrating an MCPTT service system 10b in an off-network state.

Referring to FIG. 1A, the MCPTT service system 10a may include a group management server 21a, a configuration server 22a, an MCPTT server 23a, and an MCPTT group 100. The MCPTT group 100 may include a plurality of terminals 110_1 through 110_n performing an MCPTT service. The terminals 110_1 through 110_n may be referred to as user equipment (UE) or equipment that may be used for wireless communications. The MCPTT group 100 may, through the MCPTT server 23a, provide the MCPTT service to users of the terminals 110_1 through 110_n in the on-network state. Furthermore, as in FIG. 1B, which is to be described later, the MCPTT group 100 may provide the MCPTT service in the off-network state for users of the terminals 110_1 through 110_n in a situation in which a communication infrastructure, such as a group of base stations in a network 24 to support inter-terminal communication, has been destroyed or is unavailable to provide service for any reason.

The terminals 110_1 through 110_n may, through the network 24, access the servers 21a through 23a to provide the MCPTT service. The network 24 may be one of networks including a long term evolution (LTE) network, a 5th generation (5G) network, a wireless fidelity (WiFi) basic service set, and a bluetooth network. In order to acquire MCPTT-related configuration information, the terminals 110_1 through 110_n may access the group management server 21a and the configuration server 22a in a business network of the MCPTT service. The MCPTT-related configuration information may include various information such as MCPTT user profiles (or MCPTT user IDs), a list of groups in which the users may participate, priorities in processing the users' group calls when setting up a call, and group management information (which includes information such as group MCPTT user IDs, priorities in a floor of users of each group. Throughout the specification, having the floor means having the right or a priority to talk.

Next, the terminals 110_1 through 110_n may perform a registration procedure for use of the MCPTT service. For example, when the network 24 is an LTE-based network, the terminals 110_1 through 110_n may perform an IP multimedia subsystem (IMS) registration. After the registration procedure, signals for transmission and reception of calls related to the terminals 110_1 through 110_n may be set to be transmitted to the terminals 110_1 through 110_n through the MCPTT server 23a managing MCPTT group calls. For example, in order that the terminals 110_1 through 110_n may provide the MCPTT service to the users of the terminals 110_1 through 110_n, the MCPTT server 23a may control the floor of the users of the terminals 110_1 through 110_n by using floor control messages defined in a 3rd generation partnership project (3GPP) standard, receive a real-time transport protocol (RTP) media packet from a terminal user of a user having the floor, and transmit the received RTP media packet to other terminals in the MCPTT group 100. Hereinafter, for convenience of descriptions, a terminal of a user having the floor may be referred to as a terminal having the floor, and specifications provided in 3GPP are mainly described in embodiments, but is not limited thereto.

Referring to FIG. 1B, the MCPTT service system 10b may include a group management server 21b, a configuration server 22b, a device to device (D2D) setting server 23b, and the MCPTT group 100. The plurality of terminals 110_1 through 110_n may access the group management server 21b and the configuration server 22b through a certain network and receive MCPTT offnet (off network)-related configuration information for performance of the MCPTT service. The MCPTT offnet-related configuration information may include group configuration information, and information needed to connect a D2D communication (device to device, terminal to terminal without a base station) using frequency resources without being controlled by a mobile communication infrastructure. The MCPTT offnet-related configuration information can enable an off-network group call.

The MCPTT offnet-related configuration information may include group management information, user profile information, service control information, and the like. The MCPTT offnet-related configuration information may further include group management information (which includes information about group MCPTT user IDs, priorities in the floor among users of each group, and the like), a multicast address, and an ID used in the D2D communication.

The ID used in the D2D communication may refer to a ProSe Layer-2 group ID. In some scenarios, "ProSe" refers to proximity services. The service control information may include time limit information regarding calls and request for the floor considering an MCPTT decentralized control environment in the off-network state. The plurality of terminals 110_1 through 110_n may, from the D2D setting server 23b, receive configuration information and permission information such as frequency information and geographic information, which may be used for the D2D communication.

In an embodiment, an intrinsic ProSe Layer-2 group ID may be allocated to the MCPTT group 100 that is a group permitted to use the MCPTT service in the off-network state, and an intrinsic MCPTT user ID may be allocated to each of the terminals 110_1 through 110_n included in the MCPTT group 100. The plurality of terminals 110_1 through 110_n may transmit and receive floor control messages and an RTP media packet by using the ProSe Layer-2 group ID and the multicast address, thereby performing the MCPTT service-related operations in the off-network state.

In FIG. 1B, unlike in FIG. 1A, a terminal that has obtained the floor may control the floors to the terminals 110_1 through 110_n by using the floor control message defined by the 3GPP standard. Controlling the floors refers to coordinating which terminal of two or more requesting terminals will be awarded the floor next, i.e., the right to talk next. In addition, in FIG. 1B, unlike in FIG. 1A, the terminals 110_1 through 110_n may periodically broadcast a group call announcement message from among MCPTT off-network protocol (MONP) messages defined in the 3GPP standard.

In an embodiment, each of the terminals 110_1 through 110_n may include a low power based operation module (LPBOM). The LPBOMs may be implemented as software or hardware, and when the terminals 110_1 through 110_n perform the MCPTT service-related operations, the LPBOMs may perform low power based operations. However, the embodiment is not limited to, and each of the LPBOMs, as a group of instructions executed by at least one processor of each of the terminals 110_1 through 110_n, may be stored in a memory of each of the terminals 110_1 through 110_n and referred to as a procedure, a subroutine, and the like. The at least one processor may perform the low power based operations by executing the LPBOM. The instructions may be stored in a memory, and when fetched by a processor, the processor may execute the instructions to cause the terminal hosting the processor to perform operations.

When performing the MCPTT service-related operations, there may be a case in which an operation state of a certain processor may stay unchanged. Therefore, when a certain processor is unconditionally changed from the idle state to the normal state for performance of the MCPTT service-related operations, there may be unnecessary power consumption of the terminals 110_1 through 110_n. Accordingly, when an operation state of a certain processor, which provides the MCPTT service to users by using the LPBOM, is the idle state, the terminals 110_1 through 110_n according to an embodiment may determine whether to change the operation state of the certain processor to the normal state and perform the MCPTT service-related operations. Furthermore, based on the MCPTT service-related messages, the terminals 110_1 through may control on and off states of voice codecs in the terminals 110_1 through 110_n.

The terminals 110_1 through 110_n according to an embodiment may receive the MCPTT service-related messages and perform the low power based operations based on the received MCPTT service-related messages. The MCPTT service-related messages may vary in the on-network state such as in FIG. 1A and the off-network state such as in FIG. 1B, and detailed embodiments thereof will be described later.

The terminals 110_1 through 110_n according to an embodiment make the least power consumption in performance of the MCPTT service-related operations, to thereby increase usage time with respect to the terminals 110_1 through 110_n and improve convenience for the users.

Figure 2A:
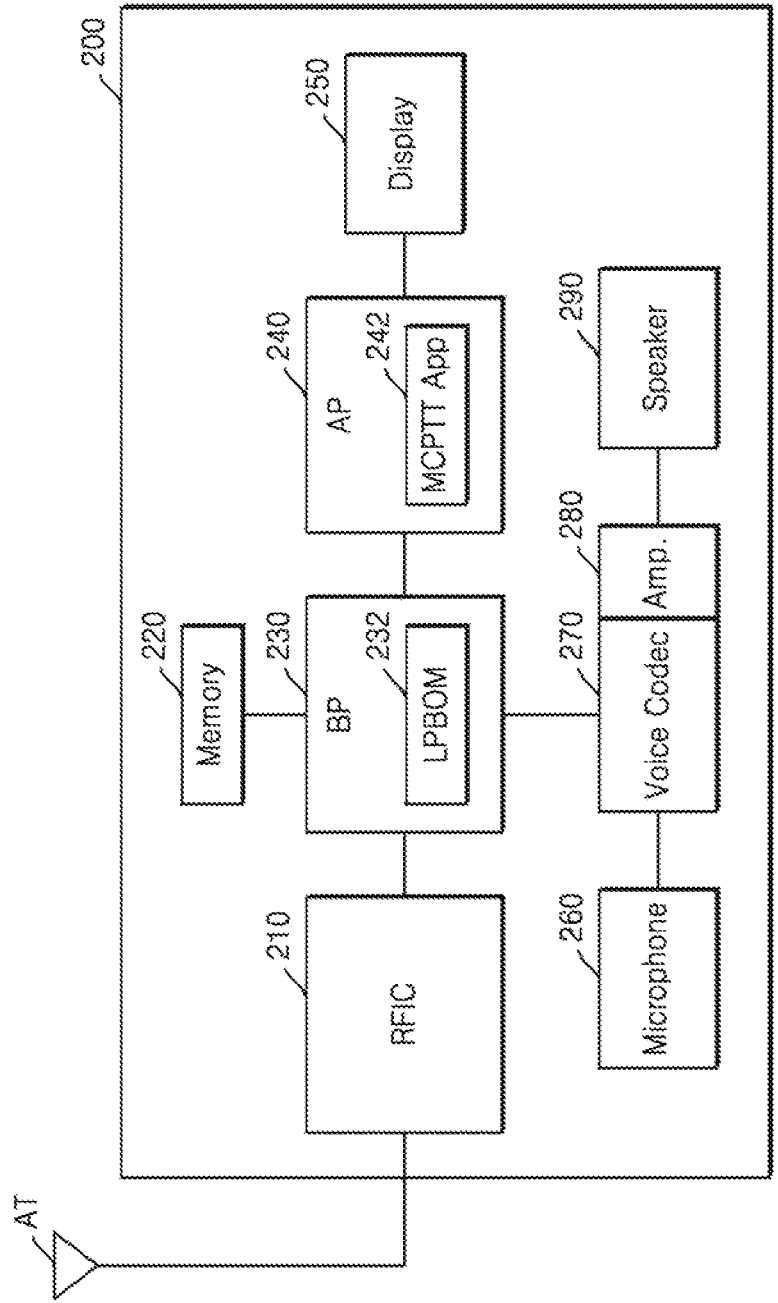
FIG. 2A is a block diagram of a terminal to provide the MCPTT service to users, according to an embodiment.
Figure 2B:
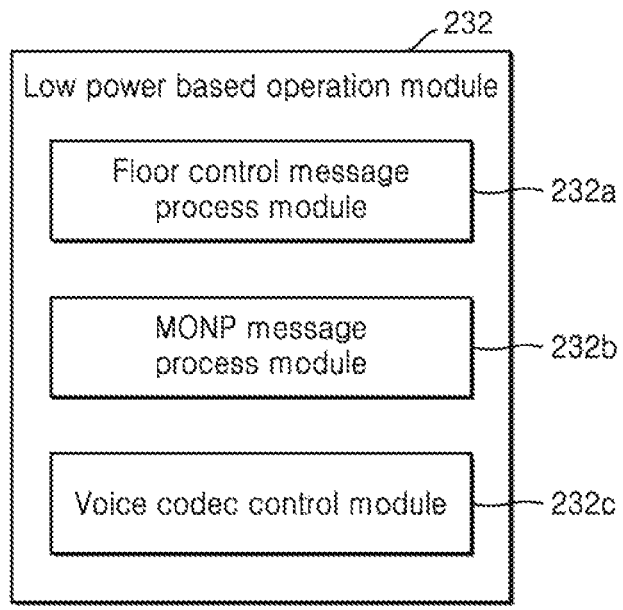
FIG. 2B is a block diagram particularly showing a lower power based operation module of FIG. 2A.

FIG. 2A is a block diagram of a terminal 200 according to an embodiment to provide the MCPTT service to users, and FIG. 2B is a block diagram particularly showing the LPBOM 232 of FIG. 2A.

Referring to FIG. 2A, the terminal 200 may include an antenna AT, a radio frequency integrated circuit (RFIC) 210, a memory 220, a baseband processor 230, an application processor 240, a display 250, a microphone 260, a voice codec 270, an amplifier 280, and a speaker 290. The memory 220, in some embodiments, holds instructions executed by the baseband processor 230. A block including the RFIC 210 and the baseband processor 230 may be defined as a modem. The RFIC 210 may receive an RF signal through the antenna AT, perform downward conversion on frequency of the received RF signal, and output the RF signal after the frequency downward conversion, in the form of a baseband signal. In addition, the RFIC 210 may perform upward conversion on frequency of a baseband signal and output the baseband signal after the frequency upward conversion, in the form of an RF signal. The RFIC 210 may include a low noise amplifier, a band pass filer, a mixer, a phase locked loop, and when intermediate frequency IF is used, the RFIC 210 may further include an IF band pass filter, an IF mixer, an IF phase locked loop, and the like.

The baseband processor 230 may generate a data signal by demodulating the baseband signal received from the RFIC 210 or generate a baseband signal by modulating the data signal, and provide the generated baseband signal to the RFIC 210.

When the terminal 200 participates in a group call established based on the MCPTT service, the baseband processor 230 may receive the MCPTT service-related messages having frequency of the baseband signal from the RFIC 210 and demodulate the MCPTT service-related messages. In an embodiment, the MCPTT service-related messages may include at least one of the floor control messages and the MONP message. The baseband processor 230 and the application processor 240 may perform operations corresponding to the MCPTT service-related messages. The application processor 240 may execute an MCPTT application 242 for providing the MCPTT service to the user of the terminal 200, and the user may use the MCPTT service through the MCPTT application 242. The application processor 240 may display MCPTT service information through the display 250, and the user may recognize the displayed MCPTT service information.

When the terminal has the floor in the group established based on the MCPTT service, the user may provide a voice signal to the terminal 200 through the microphone 260, and the voice codec 270 may convert the voice signal received from the microphone into a digital signal and provide the digital signal to the baseband processor 230. The baseband processor 230 may transmit the converted voice signal, as an RTP media packet, to the MCPTT server or other terminals in the group through the RFIC 210 and the antenna AT. When the terminal 200 does not have the floor in the group, the terminal may receive an RTP media packet from the MCPTT server or other terminals in the group. The baseband processor 230 may provide an RTP media packet to the voice codec 270, and the voice codec 270 may convert the RTP media packet into a voice signal, which is an analog signal, and provide the voice signal to the talker 290 through the amplifier 280. The user may hear the voice signal through the talker 290.

For example, the baseband processor 230 may execute the LPBOM 232 and perform low power based operations corresponding to the MCPTT service-related messages. With further reference to FIG. 2B, the LPBOM 232 may include at least one of a floor control message process module 232a, an MONP message process module 232b, and a voice codec control module 232c.

First, low power based operations according to execution of the floor control message process module 232 by the baseband processor 230 are described. The baseband processor 230 may receive a floor control message and determine whether to transmit the floor control message to the application processor 240, based on at least one of the floor control message and the operation state of the application processor 240. In some embodiments, the operation state of the application processor may be an idle state or a normal state. For example, when the application processor 240 is in an idle state, when it is determined that the operations of the application processor 240 are not currently required, the baseband processor 230 may not transmit the floor control message to the application processor 240. For another example, when the application processor 240 is in the idle state, when it is determined that the operations of the application processor 240 are currently required, the baseband processor 230 may transmit the floor control message to the application processor 240. In this case, the application processor 240 may be changed into the normal state and perform operations corresponding to the floor control message. The baseband processor 230 may receive a floor control message and determine whether the application processor in the idle state needs to be changed into the normal state, based on the floor control message.

For example, based on a type of the floor control message, the baseband processor 230 may determine whether to transmit the floor control message to the application processor 240. More particularly, when the floor control message is a message related to changing the floor with respect to other terminals participating in the group call together with the terminal 200, the baseband processor 230 may determine that the operations of the application processor 240 are not currently required. Accordingly, when the application processor is in the idle state, the baseband processor 230 may store MCPTT service information corresponding to the floor control message in the memory 220, instead of transmitting the floor control message to the application processor 240. Next, when the application processor 240 is changed from the idle state to the normal state, the MCPTT service information stored in the memory 220 may be displayed on the display 250.

When the floor control message is a message related to changing the floor with respect to the terminal 200, the baseband processor 230 may determine that the operations of the application processor 240 are currently required. Accordingly, even when the application processor 240 is in the idle state, the baseband processor 230 may transmit the floor control message to the application processor 240. By receiving the floor control message, the operation state of the application processor 240 may be changed into the normal state and the application processor 240 may perform the operations corresponding to the floor control message. For example, when the floor control message is a message indicating that the terminal 200 has obtained or lost the floor, the application processor 240 may display the aforementioned content through the display 250, and may receive an input from the user through the MCPTT application 242. Types of the floor control message may vary in the on-network state and the off-network state, and detailed embodiments thereof will be described with reference to FIGS. 3 through 5.

In an embodiment, the baseband processor 230 may identify whether the application processor 240 is in the idle state, based on whether the display 250 is on or off. For example, when the display 250 is off, the operation state of the application processor 240 may be identified to be the idle state. The baseband processor 230 may periodically or non-periodically check on and off states of the display 250. However, the embodiment of checking the display state is only one example and the teachings of this application are not limited thereto. For example, whenever the operation state of the application processor 240 is changed, the application processor 240 may provide operation state information of the application processor 240 to the baseband processor 230.

Second, low power based operations according to execution of the MONP message process module 232*b* by the baseband processor 230 are now described. The baseband processor 230 may receive a MONP message and determine whether to transmit the floor control message to the application processor 240, based on the received MONP message. The MONP message is a message received by each of the terminals in the MCPTT group for managing MCPTT calls in the off-network state. When the received MONP message is a group call announcement message, the baseband processor 230 may determine whether to transmit the group call announcement message to the application processor 240. The group call announcement message is a message that each of the terminals in the MCPTT group broadcast such that a terminal that participated in the MCPTT group later than other terminals may obtain information about the group call that is currently in progress.

In an embodiment, the baseband processor 230 may compare a received first group call announcement message and a second group call announcement message generated by the application processor 240, and based on a result of the comparison, determine whether to transmit the first group call announcement message to the application processor 240. For example, when the first group call announcement message is identical to the second group call announcement message, the baseband processor 230 may not transmit the first group call announcement message to the application processor 240, and when the first group call announcement message is different from the second group call announcement message, the baseband processor 230 may transmit the group call announcement message to the application processor 240. Detailed embodiments thereof will be described with reference to FIGS. 9 and 10.

Third, low power based operations according to execution of the voice codec control module 232*c* by the baseband processor 230 are described. In an embodiment, the baseband processor 230 may receive a floor control message, and based on the floor control message, control on and off the voice codec 270. More particularly, the baseband processor 230 may, based on the floor control message, identify whether one of the terminals in the MCPTT group has obtained the floor, and control on and off of the voice codec 270 based on a result of the identification. That is, when none of the terminals in the group has the floor, as the terminal 200 does not transmit or receive an RTP media packet, the voice codec 270 may be off to reduce power consumption. Detailed embodiments thereof will be described in FIGS. 12A and 12B.

Figure 3:
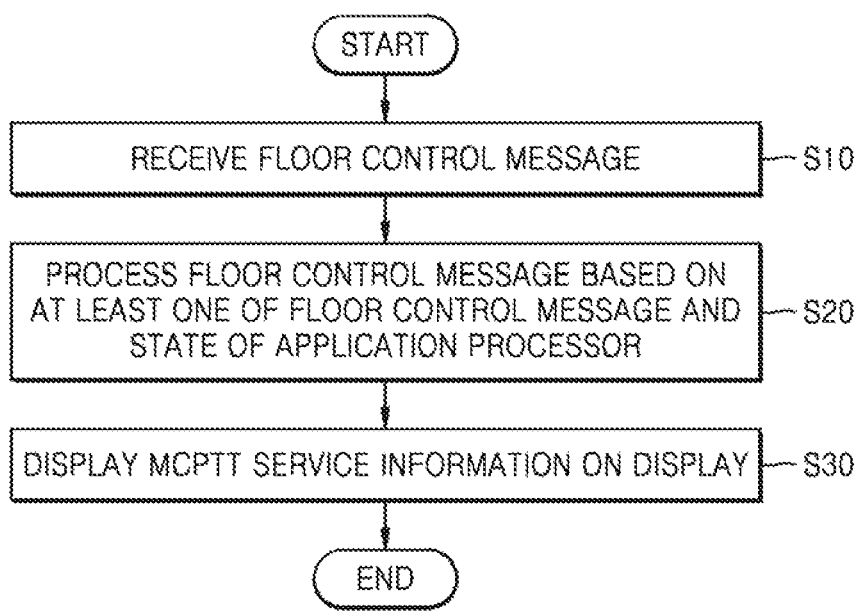
FIG. 3 is a flowchart for describing MCPTT service-related operations performed by a baseband processor and an application processor of FIG. 2A.

FIG. 3 is a flowchart for describing the operations related to the MCPTT service by the baseband processor 230 and the application processor 240 of FIG. 2A.

Referring to FIGS. 2A and 3, the baseband processor 230 may receive a floor control message (S10). The baseband processor may process the floor control message based on at least one of the received floor control message and the application processor 240 (S20). In an embodiment, when the floor control message is a message related to changing the floor with respect to the other terminals in the MCPTT group including the terminal 200, the baseband processor 230 may, based on the operation state of the application processor 240, determine whether to transmit the floor control message. For example, when the application processor 240 is in the idle state, the baseband processor 230 may temporarily store MCPTT service information corresponding to the floor control message, without transmitting the floor control message to the application processor 240. When the application processor 240 is in the normal state, the baseband processor 230 may transmit the floor control message directly to the application processor 240. In an embodiment, when the floor control message is a message related to changing the floor with respect to the terminal 200, the baseband processor 230 may transmit the floor control message to the application processor 240.

Next, in the normal state (or when the display 250 is on), by using at least one of the floor control message, which is received from the baseband processor 230, the MCPTT service information stored in the memory 220, the application processor 240 may display the MCPTT service information on the display 250 (S30).

Figure 4:
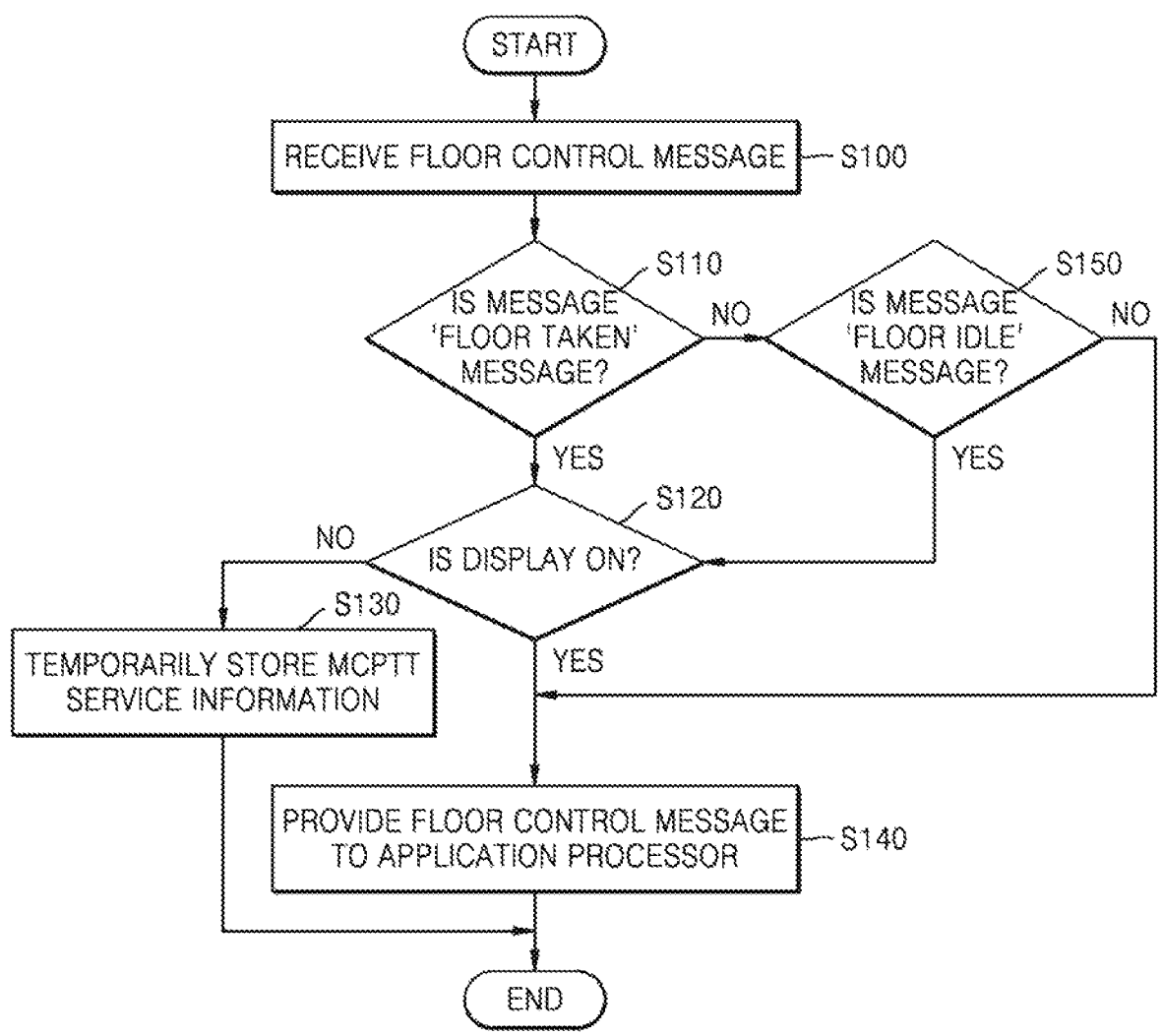
FIG. 4 is a flowchart showing operations of the baseband processor of FIG. 2A in the on-network state.

FIG. 4 is a flowchart particularly showing the operations of the baseband processor 230 of FIG. 2 in the on-network state.

Referring to FIGS. 2A and 4, in the on-network state, the baseband processor 230 may receive a floor control message from the MCPTT server 23a (S100). The baseband processor 230 may identify whether a 'Floor Taken' message is received as the floor control message (S110). The 'Floor Taken' message, when a terminal obtains the floor in the MCPTT group, is a message received by other terminals which do not obtain the floor. That is, the 'Floor Taken' message may be a message related to changing the floor with respect to other terminals in the MCPTT group. When receiving the 'Floor Taken' message (S110, Yes), the baseband processor 230 may identify whether the display 250 is on (S120). However, the embodiment is merely an illustrative example for identifying whether the application processor 240 is in the idle state and not limited thereto, and various embodiments may be used for identifying whether the application processor 240 is in the idle state. When the display 250 is off (S120, No), the baseband processor 230 may temporarily store MCPTT service information corresponding to the floor control message (the 'Floor Taken' message) in the memory 220 (S130). When the display 250 is on (S120, Yes), the baseband processor 230 may provide the floor control message (the 'Floor Taken' message) to the application processor 240 (S140).

When the baseband processor 230 does not receive the 'Floor Taken' message (S110, No), the baseband processor 230 may identify whether a 'Floor Idle' message is received as the floor control message (S150). The 'Floor Idle' message is a message received by the terminals when the terminal that had the floor in the MCPTT group has lost the floor and there is not another terminal that has requested the floor. That is, the 'Floor Idle' message may be a message related to changing the floor of other terminals. In other words, the 'Floor Idle' message may indicate that no terminal has the right to talk at the moment. When the baseband processor 230 receives the 'Floor Idle' message (S150, Yes), the baseband processor may perform the operations after the operation S120 in a way similar to an embodiment in which the baseband processor 230 received the 'Floor Taken' message.

When the baseband processor 230 does not receive the 'Floor Idle' message (S150, No), the baseband processor 230 may provide the floor control message directly to the application processor 240. For example, when the baseband processor 230 receives the message related to changing the floor with respect to the terminal itself 200, such as a 'Floor Granted (to 200), a 'Floor Deny' message, a 'floor Queue Position Info' message, the baseband processor 230 may provide the received floor control message directly to the application processor 240.

FIG. 5 is a flowchart particularly showing the operations of the baseband processor 230 of FIG. 2A in the off-network state.

Referring to FIGS. 2A and 5, in the off-network state, the baseband processor 230 may receive a floor control message from the terminal having the floor in the MCPTT group (S200). The baseband processor 230 may identify whether a 'Floor Granted' message is received as the floor control message (S210). The 'Floor Granted' message is a message received by the terminals when one of the terminals in the MCPTT group has obtained the floor. When the baseband processor 230 receives the 'Floor Granted' message (S210, Yes), the baseband processor 230 may identify whether the MCPTT user ID of the terminal 200 is included in the 'Floor Granted' message (S220). When the MCPTT user ID of the terminal 200 is not included in the 'Floor Granted' message (S220, No), the 'Floor Granted' message may be a message related to changing the floor with respect to other terminals in the MCPTT group. Accordingly, the baseband processor 230 may identify whether the display 250 is on (S230). When the display 250 is off (S230, No), the baseband processor 230 may temporarily store MCPTT service information corresponding to the floor control message (the 'Floor Granted' message) in the memory (S240). When the MCPTT user ID of the terminal 200 is included in the 'Floor Granted' message (S220, Yes), the 'Floor Granted' message may be a message related to changing the floor with respect to the terminal 200. Accordingly, the baseband processor 230 may provide the floor control message (the 'Floor Granted' message) to the application processor 240 (S250).

When the baseband processor 230 does not receive the 'Floor Granted' message (S210, No), the baseband processor 230 may identify whether a 'Floor Release' message is received as the floor control message (S260). The 'Floor Release' message is a message that the terminal had the floor in the MCPTT group transmits to other terminals when releasing the floor. That is, the 'Floor Release' message may be a message related to changing the floor with respect to other terminals. When the baseband processor 230 receives the 'Floor Release' message (S260, Yes), the baseband processor 230 may perform the operations after the operation S230 in a way similar to an embodiment in which the baseband processor 230 receives the 'Floor Granted' message.

When the baseband processor 230 does not receive the 'Floor Release' message (S260, No), the baseband processor 230 may provide the floor control message directly to the application processor 240 (S250). For example, when the baseband processor 230 receives a message related to changing the floor with respect to the terminal 200, such as a 'Floor Deny' message, 'Floor Queue Position Info' message, the baseband processor 230 may provide the received floor control message directly to the application processor 240.

Figure 6A:
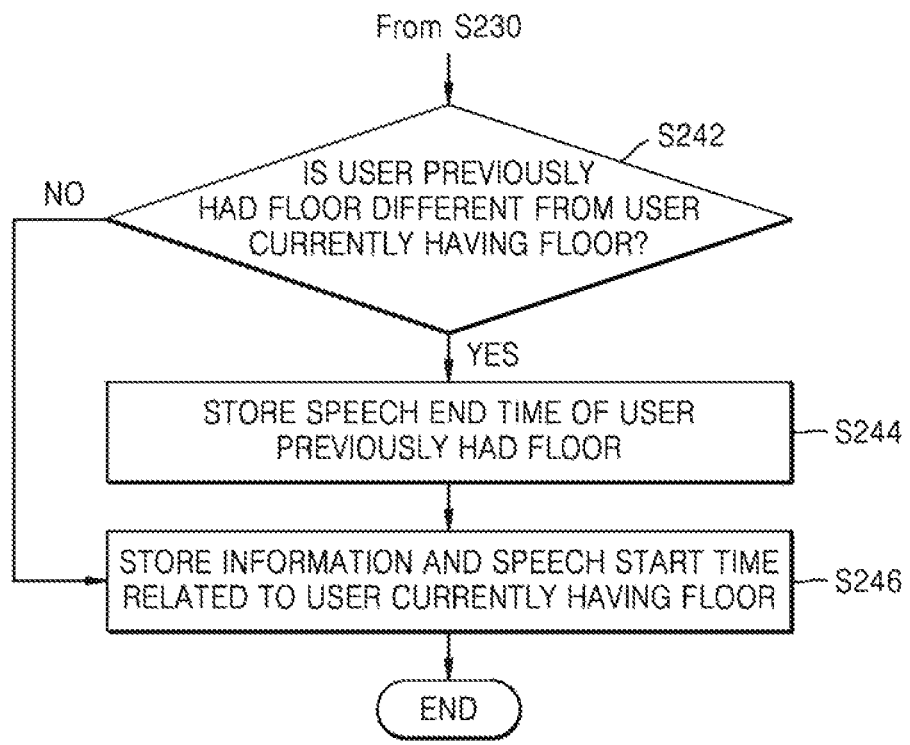
FIGS. 6A and 6B are flowcharts showing an operation S240 of FIG. 5.
Figure 6B:
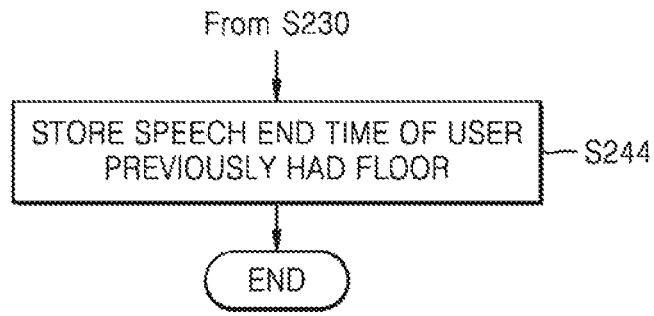

FIGS. 6A and 6B are flowchart particularly showing the operation S240 of FIG. 5.

Referring to FIGS. 2A and 6A, after the operation S230, when the baseband processor 230 receives a 'Floor Granted' message that does not include the MCPTT user ID of the terminal 200, the baseband processor 230 may identify whether a user that previously had the floor is different from a user that currently has the floor; this identification can be based on the received floor control message (S242). When the user that previously had the floor is different from the user that currently has the floor (S242, Yes), the baseband processor 230 may store a talk end time of the user that previously had the floor in the memory 220 (S244). In addition, the baseband processor 230 may store information and a talk start time of the user that currently has the floor in the memory 220 (S246). When the user that previously had the floor is identical to the user that currently has the floor (S242, No), the baseband processor 230 may omit the operation S244 and perform the operation S246. The operations of the baseband processor 230 shown in FIG. 6A may also be applied to the operation S130 in FIG. 4. The operation S242 is required when the terminal or the server controlling the floor transmits an identical floor message to the terminals, due to a situation such as an ACK signal reception error during communication performance for the MCPTT service. In an ideal communication environment, the operation S242 may be omitted.

Referring to FIGS. 2A and 6B, after the operation S230, when the baseband processor 230 receives a 'Floor Release' message, as there is no terminal that currently has the floor, the baseband processor 230 may store a talk end time of the user previously had the floor (S244) instead of storing information and a talk start time of a user currently having the floor. The operations of the baseband processor 230 shown in FIG. 6B may also be applied to the operation S130 in FIG. 4.

Figure 7:
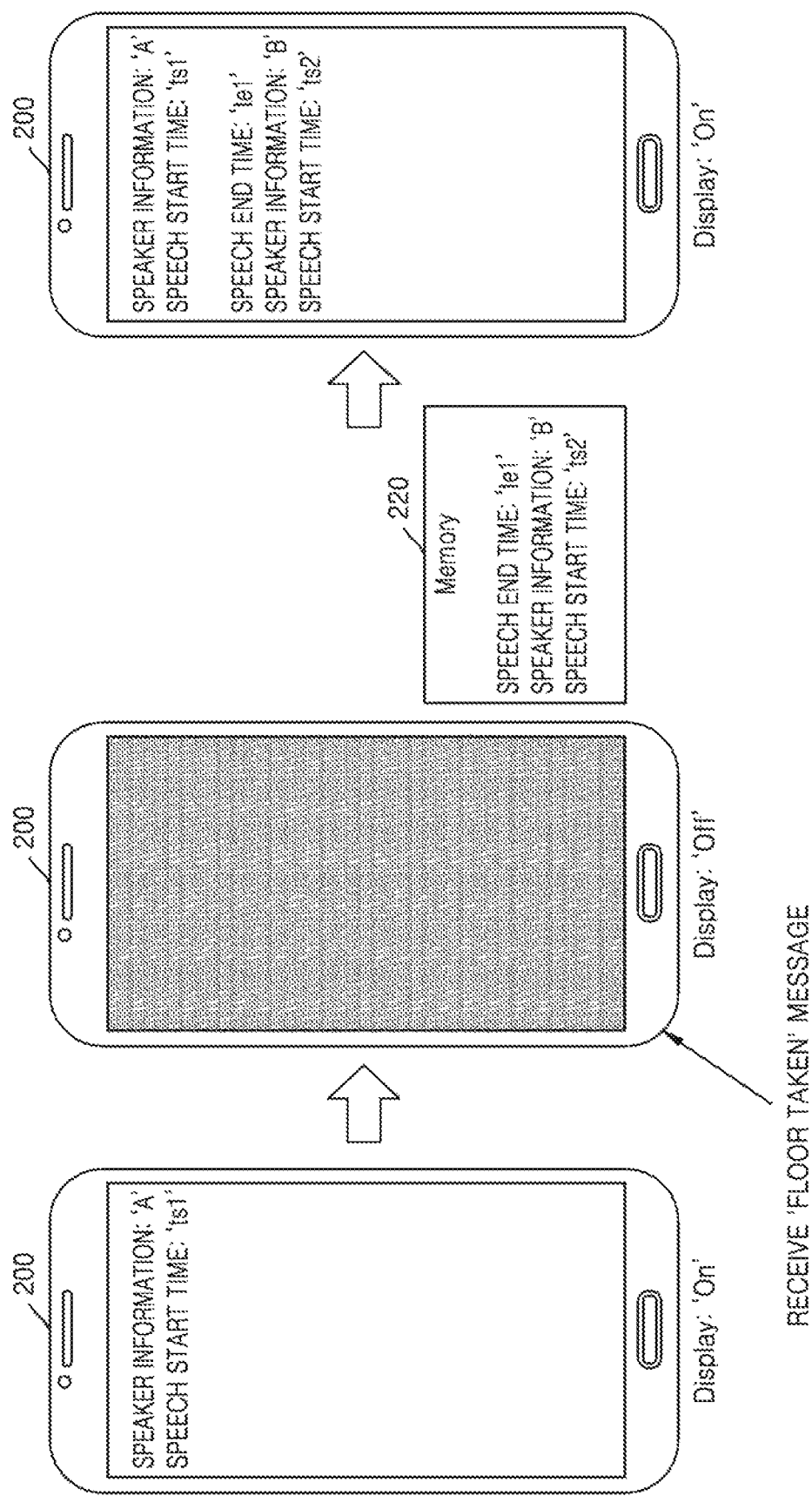
FIG. 7 is a diagram illustrating the terminal for describing an example of the operations of FIG. 4.

FIG. 7 is a diagram illustrating the terminal 200 for describing an example of the operations in FIG. 4.

Referring to FIG. 7, the user of the terminal 200 may use the MCPTT service by executing the MCPTT application. When the terminal 200 provides the MCPTT service to the user of the terminal 200, and when the display is on, the terminal 200 may display MCPTT service information to a user through means of the display; in other words, the terminal 200 may send MCPTT service information to the display. The application processor in the terminal 200 may display the MCPTT service information through the display. The MCPTT service information may include information about a current talker indicating an MCPTT user ID of a user who has obtained the floor, a talk start time of the current talker, information about a previous talker indicating an MCPTT user ID of the user who has lost the floor, and a talk end time of the previous talker.

When the display is on, the terminal 200 may display talker information 'A' indicating a user currently having the floor in the MCPTT group and a talk start time 'ts1' of the talker 'A' through the application processor. Next, as the display in the terminal 200 is off, the application processor may be changed into the idle state. And when the 'Floor Taken' message is received, as the operations of the application are not urgently needed, the baseband processor of the terminal 200 may temporarily store MCPTT service information corresponding to the 'Floor Taken' message in the memory 220. For example, the baseband processor may store a talk end time 'te1' of a previous talker, talker information 'B' indicating a user currently having the floor, and a talk start time 'ts2' of the talker 'B' in the memory 220. Next, when the display is switched from off to on, the application processor is changed from the idle state to the normal state, receives the MCPTT service information stored in the memory 220, and display the MCPTT service information after the MCPTT service information that is previously displayed.

In some embodiments, when the display is off and the application processor is in the idle state, the baseband processor may selectively transmit the floor control message to the application processor, thereby reducing unnecessary power consumption of the application processor.

Figure 8A:
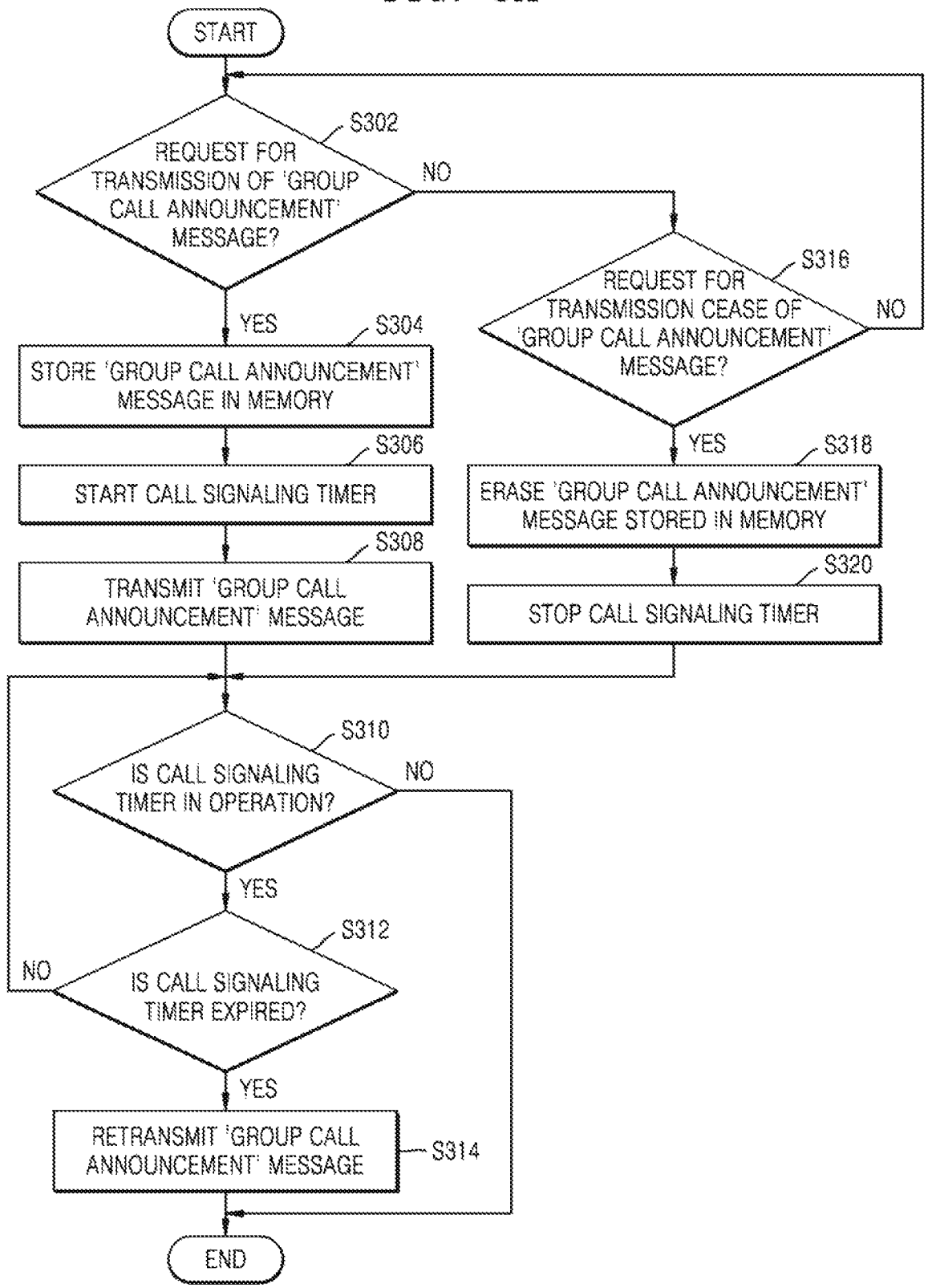
FIG. 8A is a flowchart for describing a broadcast operation of a group call announcement message of the terminal of FIG. 2A in the off-network state.

FIG. 8A is a flowchart for describing a broadcast operation of the group call announcement message of the terminal 200 in FIG. 2A in the off-network state, and FIG. 8B is a diagram for describing information included in the group call announcement message.

Referring to FIGS. 2A and 8A, the baseband processor 230 may perform the broadcast operation of the group call announcement message. When the baseband processor 230 receives the group call announcement message and a group call announcement message transmission request from the application processor 240 (S302, Yes), the baseband processor 230 may store the group call announcement message in the memory 220 (S304). Next, the baseband processor 230 may start a call signaling timer (S306), and at the same time, transmit the group call announcement message stored in the memory 220 to other terminals in the MCPTT group (S308). Next, when the call signaling timer is operating (S310, Yes), the baseband processor 230 may identify whether the call signaling timer is expired (S312). When the call signaling timer is expired (S312, Yes), the baseband processor 230 may retransmit the group call announcement message stored in the memory 220 to the other terminals (S314). When the call signaling timer is not expired (S312, No), the baseband processor 230 may repeat performing the operations, beginning from the operation S310. When the call signaling timer stops (S310, No), the baseband processor 230 may finish the broadcast operation of the group call announcement message.

When the baseband processor 230 receives a group call announcement message transmission cease request from the application processor 240 (S316, Yes), the baseband processor 230 may erase the group call announcement message stored in the memory 220 (S318). In addition, the baseband processor 230 may stop the call signaling timer (S320). Next, the baseband processor 230 may perform the operation S310. When the baseband processor 230 does not receive the group call announcement message cease request (S302, No), the baseband processor 230 may be in a reception wait state for a next group call announcement message transmission request.

With further reference to FIG. 8B, the group call announcement message may be transmitted such that the terminal may announce to other terminals that a group call is currently on progress. The group call announcement message may include an information element (IE) 310, a type/reference 320, presence 330, a format 340, and a length 350. The group call announcement message is defined in the 3GPP standard, and detailed descriptions thereof are omitted.

Figure 9:
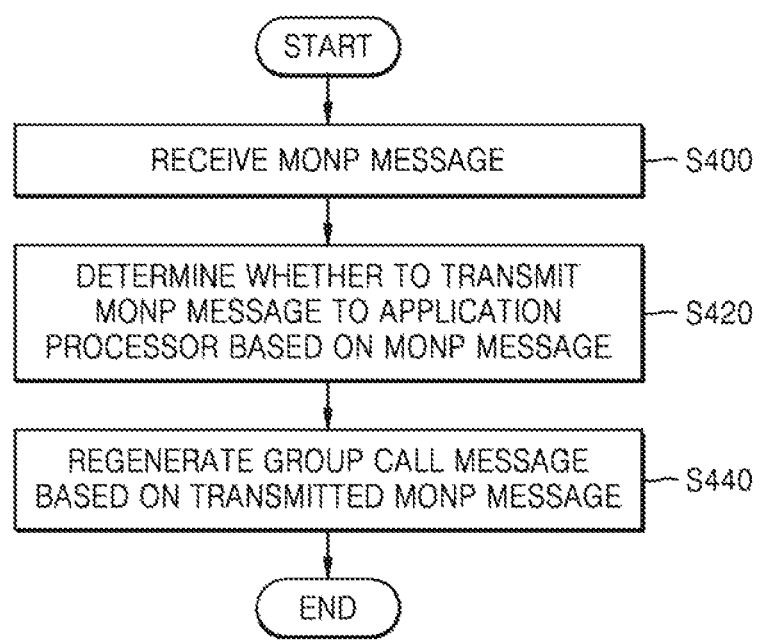
FIG. 9 is a flowchart for describing the MCPTT service-related operations of the baseband processor and the application processor of FIG. 2A in the off-network state.

FIG. 9 is a flowchart for describing the MCPTT service-related operations of the baseband processor 230 and the application processor 240 of FIG. 2A, in the off-network state.

Referring to FIGS. 2A and 9, the baseband processor 230 may receive the MONP message (S400). The baseband processor 230 may determine whether to transmit the MONP message to the application processor 240, based on the received MONP message (S420). In an embodiment, when the received MONP message is a group call announcement message, the baseband processor 230 may determine whether to transmit the MONP message to the application processor 240, based on whether the MONP message is identical to the group call announcement message generated by the application processor 240. For example, when the received MONP message is identical to the group call announcement message generated by the application processor 240, the baseband processor 230 may not transmit the MONP message to the application processor 240. When the received MONP message is different from the group call announcement message generated by the application processor 240, the baseband processor 230 may transmit the MONP message to the application processor 240. The application processor 240 may regenerate a group call announcement message, based on the MONP message received from the baseband processor 230, and may provide the regenerated group call announcement message to the baseband processor 230 (S440).

Figure 10:
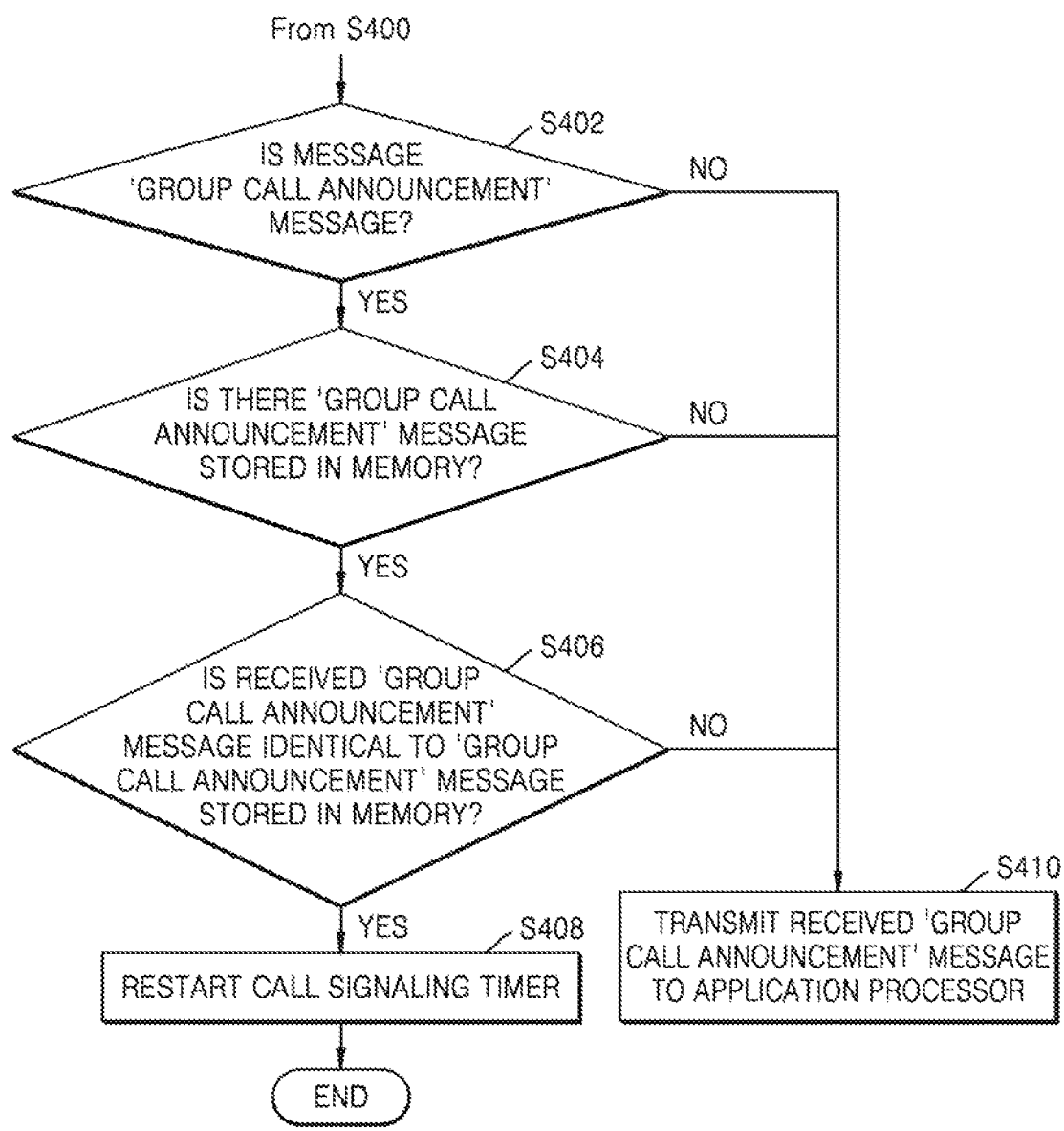
FIG. 10 is a flowchart showing the operations of the baseband processor of FIG. 2A.

FIG. 10 is a flowchart particularly showing the operations of the baseband processor 230 of FIG. 2A.

Referring to FIGS. 2A and 10, the baseband processor 230 may identify whether the MONP message received after the operation S400 is a group call announcement message (S402), and when the MONP message is the group call announcement message (S402, Yes), the baseband processor 230 may identify whether there is a group call announcement message stored in the memory 220 (S404). The group call announcement message stored in the memory 220 may have been received with the group call announcement message transmission request from the application processor 240. When the group call announcement message has been already stored in the memory 220 (S404, Yes), the baseband processor 230 may identify whether the received group call announcement message is identical to the group call announcement message stored in the memory 220 (S406). With further reference to FIG. 8B, the baseband processor 230 may compare values corresponding to the IEs 310 of the received group call announcement message and values corresponding to the IEs 310 of the group call announcement message stored in the memory 220 and identify whether the values are identical (S406). When the received group call announcement message is identical to the group call announcement message stored in the memory 220 (S406, Yes), the baseband processor 230 may restart the call signaling timer (S408). Next, when the call signaling timer is expired, the baseband processor 230 may broadcast the group call announcement message stored in the memory 220 to the other terminals in the MCPTT group. When the received group call announcement message is different from the group call announcement message stored in the memory 220 (S406, No), or when the group call announcement message is not stored in the memory 220 (S404, No), or when the MONP message is not the group call announcement message (S402, No), the baseband processor 230 may transmit the received group call announcement message to the application processor 240 (S410). The application processor 240 may generate or regenerate a group call announcement message, based on the received group call announcement message, and transmit the generated or regenerated group call announcement message to the baseband processor 230, together with the group call announcement message transmission request.

In some embodiments, the baseband processor 230 may, except when the application processor 240 has to generate or regenerate a group call announcement message, broadcast the group call announcement message by independently using the call signaling timer, instead of transmitting the group call announcement message to the application processor 240. By doing so, the power consumption of the application processor 240 to receive the group announcement message and operate is reduced, and a usage time of the terminal 200 is increased.

Figure 11:
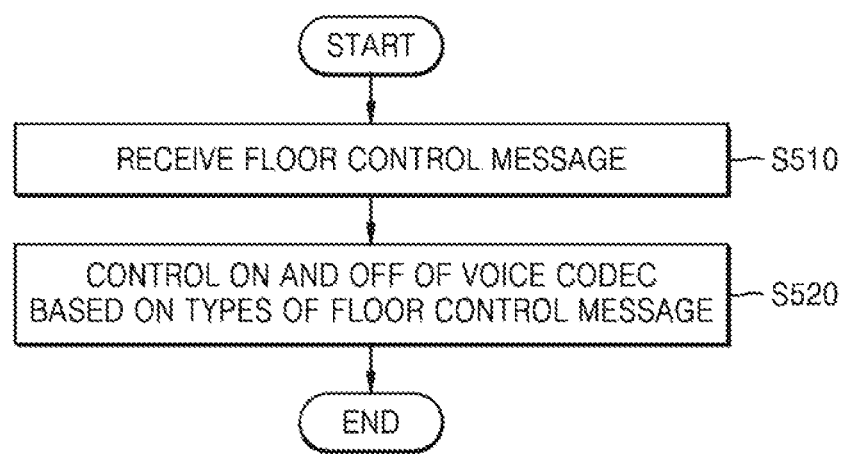
FIGS. 11, 12A, and 12B are diagrams for describing on and off control operations of the baseband processor of FIG. 2A with respect to a voice codec.
Figure 12A:
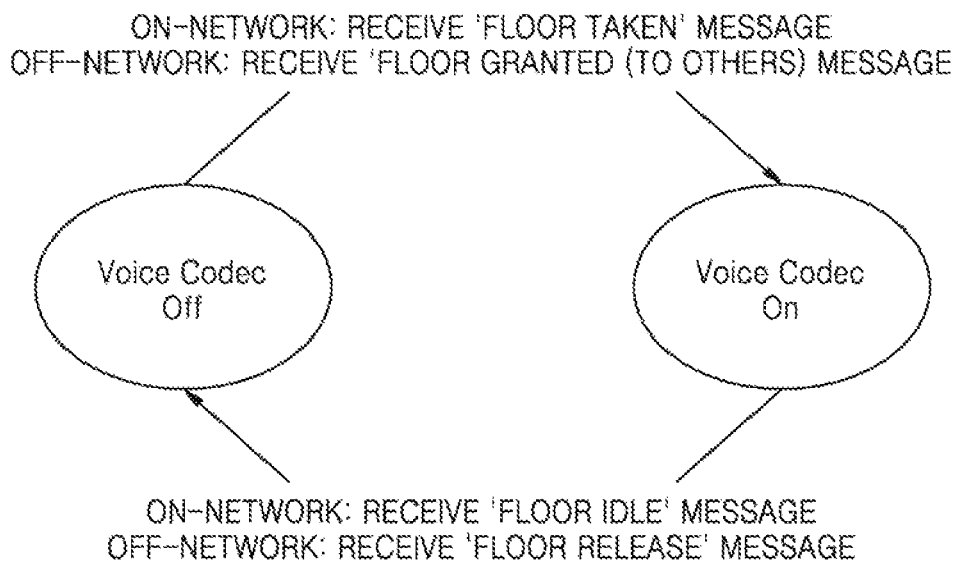
Figure 12B:
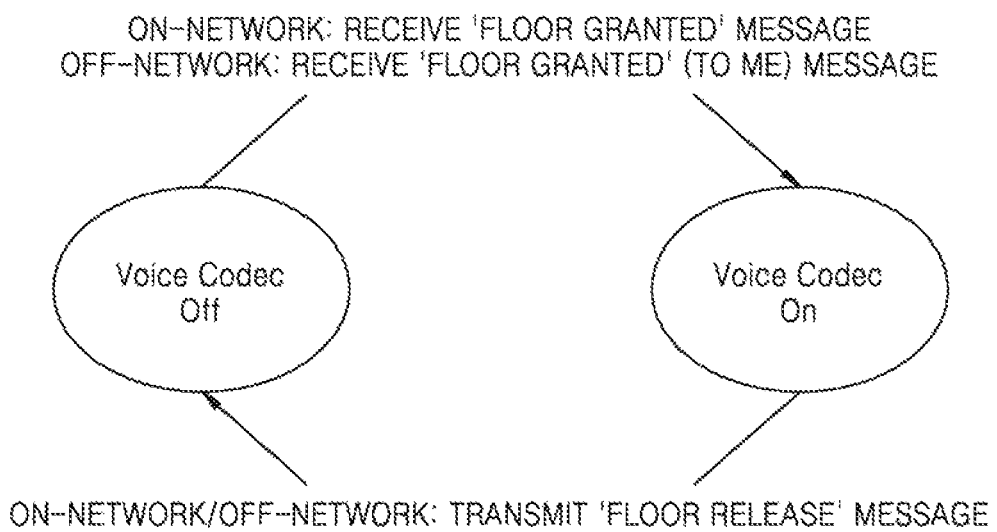

FIGS. 11, 12A, and 12B are diagrams for describing the on and off control operations of the baseband processor 230 of FIG. 2A with respect to the voice codec 270.

Referring to FIGS. 2A and 11, the baseband processor 230 may receive a floor control message (S510). The baseband processor 230 may control on and off states of the voice codec 270, based on types of the floor control message (S520). More particularly, based on the floor control message, the baseband processor 230 may identify whether there is a terminal having the floor among the terminals in the MCPTT group including the terminal 200, and based on a result of the identification, control on and off of the voice codec.

In an embodiment, with further reference to FIG. 12A, when the voice codec 270 is off and the baseband processor 230 has received the 'Floor Taken' message in the on-network state, an RTP media packet may be received from another terminal that has obtained the floor. Accordingly, in order to appropriately convert the RTP media packet to be received, the baseband processor 230 may have the voice codec 270 on in advance. When the voice codec 270 is off and the baseband processor 230 has received a 'Floor Granted (to others)' message in the off-network state, an RTP media packet may be received from another terminal that has obtained the floor. Accordingly, in order to appropriately convert the RTP media packet to be received, the baseband processor 230 may have the voice codec 270 on in advance. When the voice codec 270 is on and the baseband processor 230 has received a 'Floor Idle' message in the on-network state, there may be no terminal currently having the floor among the terminals included in the MCPTT group. Accordingly, as the terminal 200 does not transmit an RTP media packet to or receive an RTP media packet from other terminals until one of the terminals in the MCPTT group has the floor, the baseband processor 230 may have the voice codec 270 off in advance. When the voice codec 270 is off and the baseband processor 230 has received a 'Floor Release' message in the off-network state, there may be no terminal currently having the floor among the terminals included in the MCPTT group. Accordingly, as the terminal 200 does not transmit the RTP media packet to or receive the RTP media packet from other terminals until one of the terminals in the MCPTT group has the floor, the baseband processor 230 may have the voice codec 270 off in advance.

In an embodiment, with further reference to FIG. 12B, when the voice codec 270 is off and the baseband processor 230 has received a 'Floor Granted' message in the on-network state, as the terminal 200 having the floor is required to transmit an RTP media packet to the other terminals in the MCPTT group, in order to generate the RTP packet to be transmitted, the baseband processor 230 may have the voice codec 270 on in advance. When the voice codec 270 is off and the baseband processor 230 has received a 'Floor Granted (to me)' message including the MCPTT user ID of the terminal 200 in the off-network state, as the terminal 200 having the floor is required to transmit an RTP media packet to the other terminals in the MCPTT group, in order to generate the RTP media packet to be transmitted, the baseband processor 230 may have the voice codec 270 on in advance. When the voice codec 270 is on and the baseband processor 230 has transmitted the 'Floor Release' message to the other terminals in the MCPTT group in the on-network state or the off-network state, as an RTP media packet is not transmitted to the other terminals, the baseband processor 230 may have the voice codec 270 off in advance. While embodiments in which the baseband processor 230 controls the on and off states of the voice codec 270 are mainly described above, the embodiments are only illustrative and not limited thereto, and the application processor 240 may also control the on and off states of the voice codec 270.

In some embodiments, when an RTP media packet is not transmitted or received during performing the MCPTT service-related operations, the baseband processor 230 according to the inventive concept may have the voice codec 270 off, thereby preventing unnecessary power consumption by the voice codec 270.

Figure 13:
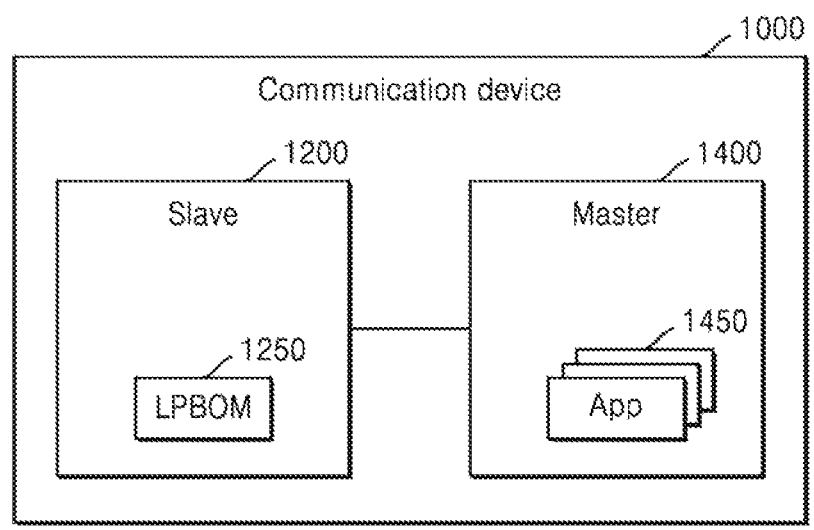
FIG. 13 is a block diagram schematically illustrating a communication device, according to an embodiment.

FIG. 13 is a block diagram schematically illustrating a communication device 1000 according to an embodiment.

Referring to FIG. 13, the communication device 1000, which may communicate with other communication devices, may include a slave 1200 and a master 1400. The communication device 1000 may perform communication operations by using the slave 1200 and the master 1400 to provide various services to users of the communication device 1000. The master 1400 may execute applications 1450 corresponding to various communication services, and the various communication services may be provided to the users through the applications 1450. In an embodiment, the slave 1200 may exchange data signals with other communication devices, and execute the LPBOM 1250, thereby performing low power based operations using the data signals. That is, the slave 1200 may selectively transmit the data signal to the master 1400 considering making the least power consumption. For example, the slave 1200 may determine whether to transmit the data signals to the master 1400, based on communication services to be provided to the users and an operation state of the master 1400. When a data signal process operation of the master 1400 is urgently needed, for example, when a user input through the applications 1450 is needed, the slave 1200 may transmit the data signal to the master 1400 without considering the operation state of the master 1400. On the other hand, when the data signal process operation of the master 1400 is not urgently needed and the master 1400 is in an idle state, the slave 1200 may not transfer the data signals directly to the master 1400. Furthermore, when the slave 1200 does not transmit the data signals to the master 1400, the slave 1200 may perform certain operations for the master 1400 to process the data signals afterwards.

The embodiments described in FIGS. 1 through 12B may also be applied to the communication device 1000.

While the present disclosure has been particularly shown and described with reference to embodiments thereof, it will be understood that various changes in form and details may be made therein without departing from the spirit and scope of the following claims.

What is claimed is:

1. A method of operating a terminal participating in a group call established based on a Mission Critical Push to Talk (MCPTT) service, wherein the terminal comprises a baseband processor and an application processor, the method comprising:
    receiving, by the baseband processor, an MCPTT off-network protocol (MONP) message;
    determining, by the baseband processor, that the received MONP message is a first group call announcement message;
    determining, by the baseband processor, whether to transmit the MONP message to the application processor, based on information in the first group call announcement message; and
    performing, by at least one of the baseband processor and the application processor, operations related to the MCPTT service, based on a result of the determining.

2. The method of claim 1 further comprising:
    receiving, by the baseband processor, a transmission request from a the application processor to transmit a second group call announcement message; and
    storing, by the baseband processor, the second group call announcement message in a memory.

3. The method of claim 2, wherein the performing of the operations related to the MCPTT service comprises periodically broadcasting the second group call announcement message by the baseband processor to at least another terminal participating in the group call.

4. The method of claim 1 further comprising comparing, by the baseband processor, the first group call announcement message and a second group call announcement message.

5. The method of claim 4, wherein the second group call announcement message is stored in a memory.

6. The method of claim 4, wherein the baseband processor is configured to transmit the first group call announcement message to the application processor based on a result of the comparison.

7. The method of claim 6, wherein if the first group call announcement message is identical to the second group call announcement message, the baseband processor does not transmit the first group call announcement message to the application processor.

8. The method of claim 6, wherein if the first group call announcement message is different from the second group call announcement message, the baseband processor transmit the first group call announcement message to the application processor.

9. The method of claim 4 further comprising determining, by the baseband processor, whether to change an operation state of the application processor, based on whether the first group call announcement message is identical to the second group call announcement message to be broadcast by the terminal.

10. The method of claim 1 further comprising restarting, by the baseband processor, to restart a call signaling timer.

11. A method of operating a terminal participating in a group call established based on a Mission Critical Push to Talk (MCPTT) service, wherein the terminal comprises a baseband processor and an application processor, the method comprising:
    receiving, by the baseband processor, an MCPTT off-network protocol (MONP) message;
    determining, by the baseband processor, that the received MONP message;
    determining, by the baseband processor, whether to transmit the MONP message to the application processor, based on whether a group call announcement message is stored in a memory; and
    performing, by at least one of the baseband processor and the application processor, operations related to the MCPTT service, based on a result of the determining.

12. The method of claim 11, wherein the group call announcement message stored in the memory is received with a group call announcement message transmission request from the application processor.

13. The method of claim 11, wherein the received MONP message is a second group call announcement message.

14. The method of claim 11, wherein the baseband processor is configured to transmit the group call announcement message stored in the memory to other terminals in a MCPTT group.

15. The method of claim 11, wherein if the group call announcement message is not stored in the memory, the baseband processor does not transmit the MONP message to the application processor.

16. The method of claim 11 further comprising:
receiving, by the baseband processor, a transmission request from a the application processor to transmit the group call announcement message; and
storing, by the baseband processor, the group call announcement message in the memory.

17. The method of claim 11 further comprising restarting, by the baseband processor, to restart a call signaling timer.

18. The method of claim 11, wherein the performing of the operations related to the MCPTT service comprises periodically broadcasting the group call announcement message by the baseband processor to at least another terminal participating in the group call.

19. A method of operating a terminal participating in a group call established based on a Mission Critical Push to Talk (MCPTT) service, wherein the terminal comprises a baseband processor and an application processor, the method comprising:
receiving, by the baseband processor, an MCPTT off-network protocol (MONP) message;
determining, by the baseband processor, whether to transmit the MONP message to the application processor, based on whether the MONP message is a group call announcement message; and
performing, by at least one of the baseband processor and the application processor, operations related to the MCPTT service, based on a result of the determining.

20. The method of claim 19, wherein the baseband processor does not transmit the MONP message to the application processor if the MONP message is not the group call announcement message.

* * * * *